United States Patent [19]
Baxter

[11] Patent Number: 5,803,960
[45] Date of Patent: Sep. 8, 1998

[54] GLASS FORMULA FOR AVOIDING ASR

[75] Inventor: Steven Z. Baxter, Brooklyn, N.Y.

[73] Assignee: The Trustees of Columbia University in the City of New York, New York, N.Y.

[21] Appl. No.: 784,046

[22] Filed: Jan. 17, 1997

[51] Int. Cl.$^6$ .................................................. C04B 14/22
[52] U.S. Cl. ........................ 106/711; 106/716; 106/737; 106/814
[58] Field of Search .................................. 106/711, 716, 106/737, 814

[56] References Cited

U.S. PATENT DOCUMENTS

| | | | |
|---|---|---|---|
| 3,783,092 | 1/1974 | Majumdar | 106/711 |
| 3,814,611 | 6/1974 | Dumbaugh, Jr. | 106/711 |
| 3,823,021 | 7/1974 | Jansen | 106/716 |
| 3,969,121 | 7/1976 | Atkinson | 106/711 |
| 3,973,974 | 8/1976 | Ohtomo et al. | 106/711 |
| 4,002,482 | 1/1977 | Coenen | 501/33 |
| 4,062,689 | 12/1967 | Suzuki et al. | 1096/711 |
| 4,090,884 | 5/1978 | Goeman | 106/716 |
| 4,115,135 | 9/1978 | Goeman et al. | 428/55 |
| 4,140,533 | 2/1979 | Ohtomo et al. | 106/711 |
| 4,345,037 | 8/1982 | Fyles et al. | 106/711 |
| 4,994,114 | 2/1991 | Thiery et al. | 106/713 |

FOREIGN PATENT DOCUMENTS

| | | | |
|---|---|---|---|
| 2808569 | 12/1978 | Germany | 106/711 |
| 54-014428 | 2/1979 | Japan | 106/711 |
| 55-003367 | 1/1980 | Japan | 106/711 |
| 9709282 | 3/1997 | WIPO . | |

OTHER PUBLICATIONS

W.J. McCoy and A.G. Caldwell, "New Approach to Inhibiting Alkali–Aggregate Expansion", J.Am.Concrete Inst., vol. 22, pp. 693–706, May, 1951.

D. Stark et al., "Eliminating or Minimzing Alkali–Silica Reactivity", Construction Technology Laboratories, Inc., Sidney Diamond, Purdue University, Stratetic Highway Research Program, Washington, DC, SHRP–C–343, 1993. No month.

M. Pattengill and T.C. Shutt, "Use of Ground Glass as a Pozzolan" presented at the Albuquerque Symposium on Utilization of Waste Glass in Secondary Products, Jan. 24–25, 1973.

Samtur, "Glass Recyclinc and Reuse" IES Report 17, p. 69 (Mar. 1974).

Batalin, "Use of Waste Sheet and Bottle Glass For Making Devitrified Glass Concrete", *Glass and Ceramics*, pp. 510–513, 1992. No month.

Xu et al., "Effectiveness of Mineral Admixtures in Reducing ASR Expansion" Cement and Concrete Research, abstract, 1995. No Month.

Reindl, "Recycling of Glass Cullet For Non–Container Uses" May 20, 1996.

ASTM Test C 1260–94 No date.

*Primary Examiner*—Anthony Green
*Attorney, Agent, or Firm*—Baker & Botts, L.L.P.

[57] ABSTRACT

The present invention relates generally to a glass formula for incorporation in glass/concrete compositions. The glass contains lithium. Alkali-silica reaction is avoided in the glass/concrete compositions.

24 Claims, No Drawings

GLASS FORMULA FOR AVOIDING ASR

BACKGROUND OF THE INVENTION

The present invention relates generally to a concrete composition which comprises pieces of glass which act as a suppressant of alkali-silica reaction between reactive aggregate and cement. Alternatively, the pieces of glass themselves avoid any reaction with cement. Specifically, the present invention relates to a concrete composition which comprises pieces of a lithium-containing glass.

For several years, industry has sought effective methods for substituting waste glass into concrete. Effective methods for introducing glass into concrete are desired because they would provide a use for recycled waste glass.

It has proven to be difficult to effectively introduce glass into concrete because concrete typically undergoes an undesirable chemical reaction with glass which causes degradation of the glass/concrete composition. This chemical reaction is termed the "alkali-silica reaction" (hereinafter "ASR"), and results from a reaction between concrete, which is alkaline, and glass, which contains silica. ASR may also result from a reaction between the concrete and silica-containing concrete aggregate other than the added glass. If unchecked, this reaction causes expansion and cracking of concrete articles.

Researchers have made several attempts to reduce or prevent problems associated with ASR. For example, U.S. Pat. No. 4,115,135 to Goeman (hereinafter "Goeman") suggests adding a water-soluble salt of barium, lithium or zinc to a mixture of wet concrete and glass to inhibit ASR. This technique is problematic because slight variations from the optimum amounts of added metal salt may actually exacerbate ASR. Moreover, in practical applications it is difficult to precisely control the amount of metal salt added. Adding lithium hydroxide to a wet concrete mixture to act as an ASR suppressor is also problematic because the lithium hydroxide may be absorbed by materials contacting the wet concrete or may be washed away upon adding water to form the wet concrete mixture.

It is also known to reinforce concrete by adding special alkali-resistant glass fibers to concrete. These alkali-resistant glass fibers are somewhat successful in avoiding ASR. However, these glasses typically must contain relatively high levels of zirconium, which makes them quite costly.

For the foregoing reasons, there is a need for an effective, inexpensive glass-containing concrete composition which avoids degradation due to ASR.

Accordingly, it is an object of the invention to provide a set glass/concrete composition with dispersed glass particles wherein the glass particles do not undergo ASR within the concrete.

Another object of the invention is to provide a set glass/concrete composition wherein the glass particles act to suppress any ASR between the concrete and a silica-containing additive.

Yet another object of the invention is to provide a set glass/concrete composition which is resistant to ASR, but does not require adding precise amounts of a metal salt to the wet concrete.

Another object of the invention is to provide a glass-fiber-reinforced concrete composition wherein said glass fibers do not contain levels of zirconium which are sufficiently high to impart enhanced alkali-resistant properties to the glass fibers.

Yet another object of the invention is to provide a process for making a set glass/concrete composition wherein ASR does not occur within the concrete.

SUMMARY OF THE INVENTION

These, and other objects of the invention are obtained by providing a glass formula for glass-containing concrete compositions which does not possess the short-comings of the prior art and offers the advantages of providing an inexpensive, clear glass which may be recycled by crushing the glass and incorporating the crushed glass in ASR-resistant glass/concrete. Specifically, the objects of the invention are obtained by incorporating lithium-containing glass particles in concrete. These lithium-containing glass particles do not contain levels of zirconium high enough to impart alkali-resistant properties to the glass. However, zirconium need not be intentionally removed, and therefore lithium-containing glass particles according to the invention may contain trace amounts of zirconium.

Further objects of the invention are obtained by providing a lithium glass fiber-reinforced concrete composition wherein the glass fibers comprise lithium but do not contain an amount of zirconium which is sufficient to impart enhanced alkali resistant properties to the glass fiber. The lithium glass fiber is advantageous because smaller diameter fibers will not be dissolved in the concrete as ordinary glass, and therefore will function as an effective reinforcement for concrete compositions. Moreover, the lithium glass fiber is superior to alkali-resistant glasses which contain high levels of zirconium because such glasses are relatively costly.

These and other features, aspects and advantages of the present invention will become better understood with reference to the following description and the appended claims.

DETAILED DESCRIPTION OF THE INVENTION

The present invention provides an ASR-resistant set glass/concrete composition and a method of making said composition. The composition comprises lithium glass particles dispersed in concrete. The lithium glass particles may be coarsely ground (>0.5 mm), and may comprise a sufficient amount of lithium to suppress ASR between the concrete and the lithium glass particles. Alternatively, the lithium glass particles may be finely ground (<0.5 mm), and may comprise a sufficient amount of lithium to suppress ASR between the concrete and a silica-containing concrete aggregate additive.

The lithium glass used to make the glass particles according to the invention may be formed, as described in the examples below, by melting ordinary soda-lime glass and substituting a certain amount of a lithium source material into the glass before cooling. However, in industrial applications, it would likely be more preferable to substitute an appropriate amount of the lithium source material into the starting mixture before forming the glass. Lithium hydroxide and lithium carbonates are examples of suitable lithium source materials, but any material which is capable of mixing with molten glass and decomposing to form lithium oxide in the glass would be suitable. Lithium hydroxide and carbonate are preferred simply because they are less costly than some other lithium source materials. In the Examples, soda-lime glass has been modified to contain lithium. However, all types of glasses are suitable for use in the present invention.

It has been discovered that if the lithium-containing glass is ground to an average particle diameter below about 0.5 mm, it will act to suppress ASR between concrete and other silica-containing concrete aggregate additives. It has also been discovered that ordinary soda-lime glass ground to average particle sizes less than about 0.5 mm does not promote ASR, whereas larger particle sizes do promote ASR. Typical silica-containing concrete aggregate additives include sand and gravel. The finely ground ASR-suppressing glass particles preferably comprise from 1.25% to 2% by weight of lithium oxide added to conventional glass such as soda-lime glass. A typical ASR-resistant set glass/concrete composition having such fine glass particles would typically comprise about 0.5% to 5% by weight lithium glass particles by weight of cement.

It has also been discovered that if lithium-containing glass is ground to an average particle size greater than 0.5 mm, or more preferably greater than 1 mm, it will not substantially reduce ASR between concrete and silica-containing concrete aggregate. However, these larger lithium glass particles will not, by themselves, cause substantial ASR. The lithium-containing glass particles having an average diameter of greater than 1 mm preferably comprise from 1.25% to 2% by weight of lithium oxide substituted into conventional soda-lime bottle glass. If the lithium oxide were introduced initially upon making the soda-lime glass it is likely that somewhat less lithium oxide would be required. Applicant has not yet determined the optimum lithium concentration under such circumstances, but estimates that amounts greater than about 0.75% by weight lithium oxide would be sufficient. A typical ASR-resistant set glass/concrete composition containing the above-described relatively large lithium-containing glass particles may optionally further comprise an aggregate material. The amount of lithium glass particles may comprise from about 0.5% to 100% by total weight of the aggregate and the lithium glass particles.

The optimal amount of lithium to introduce into the glass is dependent on the size of particles of lithium glass to be added to the concrete as well as the composition of the concrete and the type of glass to be doped with lithium. The lithium content and particle size and shape must be adjusted to achieve desired results by preparing compositions having differing amounts of lithium, measuring the ASR which results from differing lithium levels, and adjusting the level to achieve the most desirable results. A suitable test for measuring the degree of ASR is ASTM test C 1260-94, which is hereby incorporated by reference.

The lithium-containing glass may be first used as a primary material for bottles and all other commercial glass applications before recycling the glass by grinding it into pieces suitable for incorporation in concrete. The glass may be ground using conventional methods.

The concrete compositions according to the invention preferably comprise pieces of lithium glass and a suitable type of cement such as masonry cement, Portland cement, mixtures of masonry cement and Portland cement and mixtures of the above with hydrated lime. The concrete composition may also contain conventional fillers such as gravel, sand, natural or manufactured aggregates or crushed marble. As used herein, the terms filler or aggregate do not include lithium glass pieces. The filler may be any type of silica-containing concrete aggregate additive. The cement to aggregate weight ratio typically is between about 1:2.25 to about 1:8. The composition typically comprises from about 0 to 50% filler by weight of cement.

In a preferred embodiment of the invention, the glass/concrete composition is formed by mixing a suitable cement, an amount of water sufficient to fully hydrate the cement, a filler, and lithium glass particles as described above. If the glass particles are fibers, the typical percentage by weight is 0.5% to 10%. The glass/concrete composition is typically formed by adding together the water, cement, filler and lithium glass particles and mixing them to form a composition having uniformly dispersed ingredients. The composition is then allowed to set.

The lithium glass fibers preferably have a diameter of less than 0.5 mm, and therefore would be expected to act as an ASR suppressor for silica-containing aggregate. However, larger diameter fibers may also be used. The length of the lithium glass fibers typically averages from ½ inch to 1 inch.

EXAMPLE 1

Control Tests for Determining ASR

ASTM test C 1260-94 was performed to determine reference values for evaluating compositions according to the present invention. This test generally involves producing test concrete bars of precise composition which comprise a test aggregate. The bars are later placed in an aqueous sodium hydroxide solution, and their degree of expansion, which is indicative of the degree of ASR, is measured at precise times. All the values for percent expansion reported below are at 16 days as specified by ASTM test C 1260-94.

The test was, however, modified as described below. Table 1 is copied from ASTM test C 1260-94 and describes the grading requirements of the aggregate to be mixed with the concrete to form the test concrete bars.

TABLE 1

| Grading Requirements Sieve Size | | |
|---|---|---|
| Passing | Retained on Screen | Mass % |
| 4.75 mm (No. 4) | 2.36 mm (No. 8) | 10 |
| 2.36 mm (No. 8) | 1.18 mm (No. 16) | 25 |
| 1.18 mm (No. 16) | 600 mm (No. 30) | 25 |
| 600 mm (No. 30) | 300 mm (No. 50) | 25 |
| 300 mm (No. 50) | 150 mm (No. 100) | 15 |

Table 1 describes the sizes of particles mixed to form a graded aggregate used in ASTM test C 1260-94. For example, Table 1 states that the aggregate should contain 10% by mass of particles having a size which allows them to pass through a No. 4 screen while being retained on a No. 8 screen. The test specifies that the dry materials used to form the test specimens contain 1 part by weight of cement to 2.25 parts by weight of graded aggregate by mass. For the examples described herein, the ASTM C 1260-94 test was modified by instead using: 0.9×2.25=2.025 parts by weight of reactive aggregate according to Table 1; 0.1×2.25=0.225 parts by weight of reactive aggregate having a size such that it will pass through a No. 8 screen, but will be retained on a No. 16 screen; and 1 part by weight of cement.

A reference value for non-reactive aggregate concrete composition was determined by performing ASTM test C 1260-94 using Blue Circle aggregate (sand) mined at Blue Circle Co.'s Hamburg, N.J. quarry. This sand produced a fractional expansion of 0.039%. A reactive aggregate concrete composition reference value was determined by performing ASTM test C 1260-94 using a mixture of 90% of the Blue Circle aggregate and 10% of conventional clear bottle glass ground to a sufficiently fine particle size such that it passes through a No. 8 screen and is retained on a No. 16 screen (greater than ~1.2 mm diameter). This mixture produced an expansion of 0.3%. ASTM test C 1260-94 specifies that an expansion of less than 0.10% after 16 days indicates innocuous behavior (with respect to ASR), whereas expansions of more than 0.20% are indicative of potentially deleterious expansion (caused by ASR).

EXAMPLE 2

Tests Demonstrating that Finely Ground Lithium Glass Particles Act as an ASR Suppressor Tests were performed using ASTM test C 126-94 modified as described above to determine whether adding an amount of finely ground lithium-containing glass would suppress ASR in a concrete composition containing reactive aggregate. Specifically, these test compositions were prepared in the same manner as described in Example 1 for the reactive aggregate concrete composition with the exception that 10% of the cement used to form the test bars was replaced by finely ground glass containing lithium oxide. Specifically, the glass having various amounts of added lithium oxide was prepared and ground to an average particle size of about 10 microns (passing through 400 mesh screen) before substitution into the concrete composition as described below. Lithium glass-concrete compositions having 0.5%, 1% and 1.5% lithium oxide added to the crushed clear bottle glass caused the test bars to exhibit reduced degrees expansion of 0.068%, 0.041% and 0.034%, respectively. A further test performed in an analogous manner using the clear bottle glass without added lithium produced an expansion of 0.167%. A more detailed description of how the lithium-containing glass was prepared follows below.

The 1% lithium oxide glass was prepared via the following procedure. Twenty grams of lithium carbonate were mixed with 800 grams of crushed clear bottle glass having an average particle size of 0.5 mm. This mixture was placed in a one liter mullite crucible and was heated in an electric furnace under oxidizing conditions (i.e., vented to air). The temperature was ramped up to 2450° F. at a rate of 500° F./hour. The temperature was held at 2450° F. for two hours before the furnace was allowed to cool back to room temperature (approximately 6 hours). Under these conditions, the lithium carbonate is thought to decompose into lithium oxide, thereby liberating $CO_2$ which bubbles out of the molten glass. After the furnace cooled, the crucible was removed from the furnace and broken off of the glass, which remained in a single lump. Some remaining crucible material was then ground off the surface with a silicon carbide grinding wheel. The glass was subsequently pre-crushed to an average particle size of less than 0.5 mm and placed in a 5 quart porcelain jar mill with 10 pounds of ~1 inch diameter porcelain balls. The jar was then rotated for 6 hours to mill the glass to finer sizes. After milling, the glass was removed and passed through a 400 mesh screen. The final ground glass particles had an average particle size of about 10 microns. Ground glass particles having added lithium oxide percentages of 0.5 and 1.5 were also prepared by the same procedure.

EXAMPLE 3

Tests Demonstrating that Less Finely Ground Lithium Glass Particles do not Cause ASR The following tests were performed to demonstrate that relatively large lithium glass particles can be substituted for the 10% normal bottle glass in the reactive aggregate concrete composition described in Example 1 without causing unacceptable ASR.

First, 1% and 1.5% lithium glass was prepared as described above in Example 2 with the exception that the crushed glass was instead screened for particles which passed through a No. 8 screen, but were retained on a No. 16 screen (approximate average particle size=1.2 mm). Two tests were run according to ASTM test C 1260-94 wherein these lithium glass particles were substituted for the 10% by weight bottle glass used in the reactive aggregate described in Example 1. The 1% lithium glass produced an expansion of 0.147% which is less than the 0.3% observed for clear bottle glass in the reactive aggregate control experiment, but is still an unacceptably high degree of expansion. The 1.5% by weight lithium glass produced an expansion of 0.71% which is acceptable. Therefore, if a sufficient amount of lithium is substituted into normal bottle glass, the modified normal bottle glass may be advantageously recycled as an additive for concrete.

PROPHETIC EXAMPLE 4

Prophetic Example Demonstrating a Reinforced Concrete Composition Containing Lithium Glass Fibers A 1.5% lithium oxide substituted glass is prepared as described above in Example 2. This lithium glass is made into fiberglass via heating and drawing fibers by hand. The fibers have an average length of ¾ inch and an average diameter of 10–40 microns. The fiberglass reinforced cement is prepared by mixing together the following:

| | |
|---|---|
| 440 g | Portland cement |
| 990 g | Blue Circle aggregate graded as described above in Table 1 |
| 4.4 g | lithium oxide substituted fiberglass |
| 672 g | water. |

The above mixture is allowed to set. The reinforced concrete produced is thought to have improved mechanical properties compared with an analogous glass fiber reinforced concrete using conventional soda-lime fiberglass because conventional soda-lime fiberglass dissolves in the concrete due to ASR. However, the lithium oxide substituted fiberglass does not undergo ASR, and therefore does not dissolve.

Although the present invention has been described in considerable detail with reference to certain preferred versions thereof, other versions are possible. For example, different types of cements and glasses could be tested by preparing samples generally by using the above procedure. For instance, glasses containing various different metals could be tested by adding lithium into the glass, preparing concrete compositions as described above and using ASTM test C 1260-94 to determine if ASR is reduced. Therefore, the spirit and scope of the appended claims should not be limited to the description of the preferred versions contained herein.

I claim:

1. An ASR-resistant set glass/concrete composition which comprises lithium glass particles dispersed in concrete, wherein said lithium glass particles have an average diameter of less than 0.5 mm and comprise a sufficient amount of lithium to suppress alkali-silica reaction between the concrete and a silica-containing concrete aggregate additive, wherein the lithium glass particles do not contain an amount of zirconium which is sufficient to impart enhanced alkali resistant properties to the glass particles.

2. An ASR-resistant set glass/concrete composition which comprises lithium glass particles dispersed in concrete, wherein said lithium glass particles have an average diameter of greater than 0.5 mm and comprise an amount of lithium effective to cause suppression of alkali-silica reaction between the concrete and the lithium glass particles, wherein the lithium glass particles do not contain an amount of zirconium which is sufficient to impart enhanced alkali resistant properties to the glass particles.

3. An ASR-resistant set glass/concrete composition according to claim 1, wherein the lithium glass particles contain trace amounts of zirconium.

4. An ASR-resistant set glass/concrete composition according to claim 2, wherein the lithium glass particles contain trace amounts of zirconium.

5. An ASR-resistant set glass/concrete composition according to claim 1, wherein the lithium glass particles have a clear color.

6. An ASR-resistant set glass/concrete composition according to claim 2, wherein the lithium glass particles have a clear color.

7. An ASR-resistant set glass/concrete composition according to claim 1, wherein the lithium glass particles are fibers.

8. An ASR-resistant set glass/concrete composition according to claim 2, wherein the lithium glass particles are fibers.

9. An ASR-resistant set glass/concrete composition according to claim 2, wherein the lithium glass particles comprise soda lime glass comprising from 1.25% to 2% by weight of lithium oxide.

10. An ASR-resistant-set glass/concrete composition according to claim 2, wherein the lithium glass particles comprise more than 0.75% by weight of lithium oxide.

11. An ASR-resistant set glass/concrete composition according to claim 1, wherein the lithium glass particles comprise soda lime glass comprising from 1.25% to 2% by weight of lithium oxide.

12. An ASR-resistant set glass/concrete composition according to claim 1, wherein the composition comprises cement and from 0.5% by weight to 50% by weight lithium glass particles by weight of cement.

13. An ASR-resistant set glass/concrete composition according to claim 2, wherein the composition optionally further comprises an aggregate material and wherein the combination of aggregate material and lithium glass particles comprises from 0.5% by weight to 100% by weight lithium glass particles.

14. A process for making an ASR-resistant set glass/concrete composition which comprises mixing cement, water, a silica-containing concrete aggregate and lithium glass particles having an average diameter of less than 0.5 mm and comprising an amount of lithium effective to cause suppression of alkali-silica reaction between the concrete and the aggregate, wherein the lithium glass particles do not contain an amount of zirconium which is sufficient to impart enhanced alkali resistant properties to the glass particles.

15. A process for making an ASR-resistant set glass/concrete composition which comprises mixing cement, water, and lithium glass particles having an average diameter of greater than 0.5 mm and comprising an amount of lithium effective to cause suppression of alkali-silica reaction between the concrete and the glass particles, wherein the glass particles do not contain an amount of zirconium which is sufficient to impart enhanced alkali resistant properties to the glass particles.

16. A process according to claim 15, wherein the glass comprises soda lime glass comprising from 1.25% to 2% by weight of lithium oxide.

17. A process according to claim 15, wherein the glass comprises more than 0.75% by weight lithium oxide.

18. A process according to claim 14, wherein the glass comprises from 0.25% to 2% by weight of lithium oxide.

19. A process according to claim 14, wherein the lithium glass particles are fibres.

20. A process according to claim 15, wherein the lithium glass particles are fibres.

21. An ASR-resistant set glass-concrete composition which comprises a product formed by mixing together water, cement, a silica-containing concrete aggregate additive, and lithium glass particles having an average diameter of less than 0.5 mm and which comprise a sufficient amount of lithium to suppress alkali-silica reaction with the silica-containing concrete aggregate additive, wherein the lithium glass particles do not contain an amount of zirconium which is sufficient to impart enhanced alkali resistant properties to the glass particles.

22. An ASR-resistant set glass/concrete composition which comprises a product formed by mixing together a glass/concrete precursor mixture comprising water, cement, a silica-containing concrete aggregate additive, and lithium glass particles having an average diameter of greater than 0.5 mm and which comprise a sufficient amount of lithium to cause suppression of alkali-silica reaction between the concrete and the lithium glass particles, wherein the lithium glass particles do not contain an amount of zirconium which is sufficient to impart enhanced alkali resistant properties to the glass particles.

23. An ASR-resistant set glass/concrete composition according to claim 21, wherein the lithium glass particles are fibers.

24. An ASR-resistant set glass/concrete composition according to claim 22, wherein the lithium glass particles are fibers.

* * * * *

UNITED STATES PATENT AND TRADEMARK OFFICE
CERTIFICATE OF CORRECTION

PATENT NO. : 5,803,960

DATED : September 8, 1998

INVENTOR(S) : Steven Z. Baxter

It is certified that error appears in the above-identified patent and that said Letters Patent is hereby corrected as shown below:

Col. 4, Table 1, "600 mm" (both occurrences) should read -- 600µm --; Table 1, "300 mm" (both occurrences) should read -- 300µm --; Table 1, "150 mm" should read -- 150µm --. Col. 5, line 8, "ASTM test C 126-94" should read --ASTM test C 1260-94-- ; line 59, "do not" should read -- Do Not --. Col. 6, line 11, "0.71%" should read -- 0.071% --.

Signed and Sealed this

Sixth Day of June, 2000

Attest:

Attesting Officer

Q. TODD DICKINSON

Director of Patents and Trademarks